United States Patent Office 3,629,405
Patented Dec. 21, 1971

3,629,405
ANTIBIOTICS A4993A AND A4993B AND PROCESS FOR PRODUCING THE ANTIBIOTICS
Robert L. Hamill and Marvin M. Hoehn, Indianapolis, Ind., assignors to Eli Lilly and Company, Indianapolis, Ind.
Filed July 28, 1969, Ser. No. 845,378
Int. Cl. A61k 21/00
U.S. Cl. 424—117
6 Claims

ABSTRACT OF THE DISCLOSURE

Antibiotics A–4993A and A–4993B, produced by *Streptomyces kentuckensis* strain NRRL 3552 under aerobic conditions in liquid culture medium, isolated from fermentation broth as antibiotic mixture via cationic exchange resin and separated via magnesium silicate or cellulose chromatography and separately purified over sulfuric acid washed alumina have, individually or as mixture, anthelmintic, antibacterial, antifungal and antitrypanosome activity.

BACKGROUND OF THE INVENTION

Figure 1:
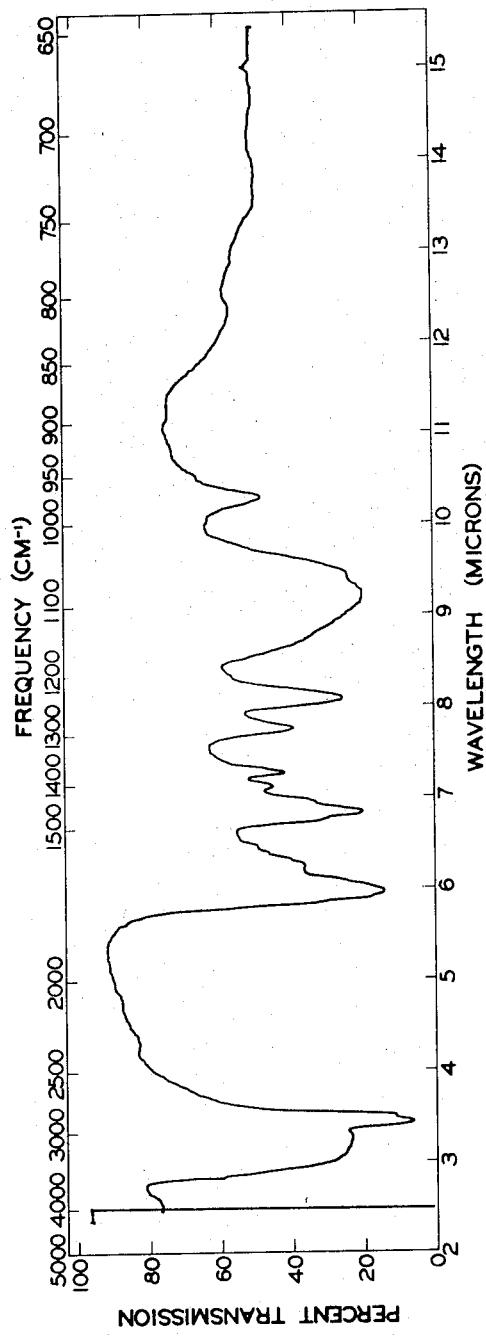

The varieties of the disease known as sleeping sickness are among the prevalent tropical maladies afflicting human and animal inhabitants of the world's tropical areas. The causative organisms of these diseases are parasitic trypanosomes. For example, Gambian or Central African sleeping sickness is caused by the parasite *Trypanosoma gambiense*, transmitted by the vector *Glossina palpalis* (tsetse fly), Rhodesian or East African sleeping sickness is caused by *Trypanosoma rhodesiense* which is transmitted to the victim by *Glossina mossitans* and *Glossina pallidipes*. Other widespread trypanosome-caused disease states include Chagas' disease, or American trypanosomiasis, prevalent in South and Central America. *Trypanosoma cruzi* is the causative parasitic organism of the latter disease. *Trypanosoma congolense* is the causative organism of plasmosis in African cattle.

Although a number of antibiotics have been developed, some of which possess activity against the trypanosomes, there remains a need for more effective agents useful in the treatment of trypanosomiasis.

SUMMARY

This invention relates to novel antibiotic agents and to their preparation. More particularly, this invention relates to two novel nitrogenous antibiotics, arbitrarily denominated herein as A–4993A and A–4993B.

The antibiotics of this invention are produced by culturing the organism *Streptomyces kentuckensis*, strain NRRL 3552, in an aqueous nutrient medium under submerged aerobic fermentation conditions. The antibiotics are isolated from the filtered fermentation broth as a mixture by column chromatography over a cationic exchange resin and elution therefrom with 0.1 N sulfuric acid. The individual antibiotics, as sulfate salts, comprising the mixture thus obtained are separated by chromatography over magnesium silicate or cellulose adsorbents and purified and obtained as crystalline sulfates by further chromatography over sulfuric acid washed alumina. The novel antibiotics of this invention, A–4993A and A–4993B possess antibacterial, antifungal, anthelmintic and antitrypanosomal activity.

DETAILED DESCRIPTION

The novel antibiotics of this invention are basic compounds capable of forming salts with suitable acids. The characterization data presented below are for antibiotics A–4993A and A–4993B in the form of their sulfate salts. The antibiotics are conveniently isolated and characterized as sulfate salts, although other pharmaceutically acceptable salts can be prepared by employing methods well known in the art.

Antibiotic A–4993A, as the sulfate salt, is a white crystalline compound melting with decomposition at about 230° C. A–4993A sulfate is readily soluble in water and relatively insoluble in most of the common organic solvents. It can be recrystallized conveniently from mixtures of ethanol and water.

Electrometric titration of A–4993A sulfate in 66 percent aqueous dimethylformamide shows the presence of three titratable groups having pK'a values of about 5.4, 9.8, and 12.2. The molecular weight of A–4993A sulfate, calculated from the titaration data is approximately 623.

Microanalysis gives the following approximate percent elemental composition of A–4993A sulfate on a sample dried at 100° C. C, 37.60; H, 5.44; N, 19.62; O, 28.24 (direct); S, 7.03.

The infrared absorption spectrum of A–4993A as the crystalline sulfate salt in a mineral oil mull is shown in FIG. 1 of the accompanying drawings. The observed distinguishable bands in the infrared absorption spectrum over the range of 2.0 to 15 microns are as follows: 3.2 (broad), 5.97, 6.26, 6.33, 6.39, 6.47, 6.78, 6.84, 6.94, 7.12, 7.28, 7.76, 8.08, 9.2 (broad), 9.45 (broad), and 10.30 microns.

The ultraviolet absorption spectrum of A–4993A sulfate in aqueous solution shows an absorption maximum at about 232 m$\mu$, with a molar extinction of $$E_{1\,cm.}^{1\%} = 250$$

and an absorption maximum at about 324 m$\mu$, with a molar extinction of $$E_{1\,cm.}^{1\%} = 342$$

The ultraviolet absorption spectrum of A–4993A sulfate in aqueous ethanol adjusted to acid pH shows absorption maxima at about 240 m$\mu$ and 325 m$\mu$. On adjustment to basic pH, the maximum at about 240 m$\mu$ (acid) is shifted to a barely discernible maximum at about 238 m$\mu$, while the maximum at about 325 m$\mu$ (acid) is shifted to about 367 m$\mu$.

A powder X-ray diffraction pattern of the sulfate salt of A–4993A using vanadium-filtered chrominum radiation and a wavelength value of 2.2896 A. for calculating the interplanar spacings gives the following values:

| d | $I/I_1$ |
|---|---|
| 5.96 | .10 |
| 5.54 | .20 |
| 5.25 | .10 |
| 4.75 | .70 |
| 4.21 | .15 |
| 3.94 | .80 |
| 3.80 | .70 |
| 3.58 | .30 |
| 3.48 | .30 |
| 3.36 | .15 |
| 3.25 | .20 |
| 2.96 | .15 |
| 2.82 | 1.00 |
| 2.64 | .60 |
| 2.39 | .30 |
| 1.96 | .20 |
| 1.74 | .30 |
| 1.58 | .10 |
| 1.56 | .10 |
| 1.46 | .20 |

Antibiotic A–4993B sulfate is a white crystalline compound melting with decomposition at about 257–258° C. A–4993B sulfate is readily soluble in water and relatively insoluble in most of the common organic solvents. It can be conveniently recrystallized from ethanol-water mixtures.

Electrometric titration of A–4993B sulfate in 66 percent aqueous dimethylformamide shows the presence of three titratable groups which have pK'a values of about 5.0, 10.1 and 11.6. The pK'a value of 5.0 can be attributed to the sulfate moiety. The molecular weight as determined from the titration data is approximately 432.

Microanalysis of A–4993B gives the following approximate percent elemental composition on a sample of the antibiotic dried at 100° C.: C, 37.26; H, 5.23; N, 22.16; O, 27.6; S, 7.4.

Figure 2:
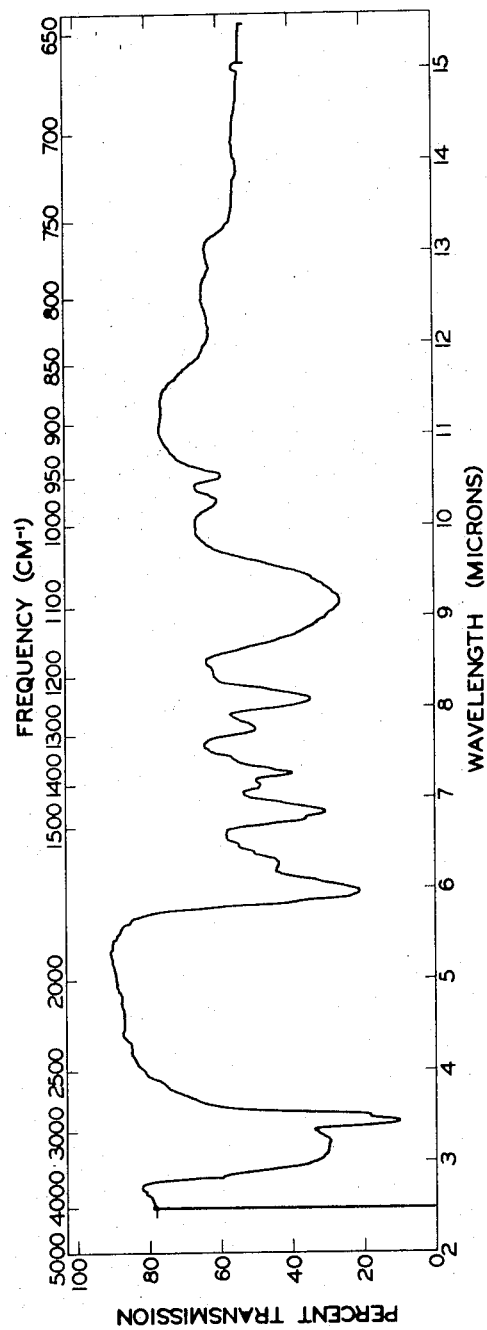

The infrared absorption spectrum of A–4993B as the crystalline sulfate salt in a mineral oil mull is shown in FIG. 2 of the accompanying drawings. The following distinguishable absorption maxima in the spectrum are observable over the range of 2.0 and 15.0 microns: 3.15 (broad), 3.44, 3.51, 5.97, 6.29, 6.50, 6.77, 7.12, 7.28, 7.47, 7.77, 8.10, 9.7 (broad), 10.28 and 10.56 microns.

The ultraviolet absorption spectrum of the crystalline sulfate of A–4493B in aqueous solution shows absorption maxima at wavelengths of about 233 m$\mu$ and 321 m$\mu$ with molar extinction values of $$E_{1 cm.}^{1\%} = 332 \text{ and } 480$$

respectively. In alkaline ethanol solution, the ultraviolet absorption spectrum of A–4993B sulfate shows a single maximum at a wavelength of about 366 m$\mu$, while in acidic ethanol solution two absorption maxima are observed at wavelengths of about 326 m$\mu$ and 237 m$\mu$.

A powder X-ray diffraction pattern of the crystalline sulfate of A–4993B using vanadium filtered chromium radiation and a wavelength value of 2.2896 A. for calculating the interplanar spacings gives the following values:

| d | I/I$_1$ |
|---|---|
| 14.07 | .50 |
| 8.62 | .10 |
| 7.02 | .05 |
| 6.36 | .30 |
| 5.96 | .30 |
| 5.63 | .20 |
| 5.39 | 1.00 |
| 5.17 | .30 |
| 4.80 | .20 |
| 4.67 | 1.00 |
| 4.37 | .30 |
| 4.29 | .30 |
| 4.18 | .30 |
| 3.97 | 1.00 |
| 3.81 | .50 |
| 3.59 | .90 |
| 3.48 | .02 |
| 3.36 | .50 |
| 3.26 | .70 |
| 3.08 | .10 |
| 2.97 | .60 |
| 2.85 | .05 |
| 2.73 | .02 |
| 2.68 | .08 |
| 2.60 | .02 |
| 2.47 | .02 |
| 2.40 | .05 |
| 2.35 | .08 |
| 2.24 | .02 |
| 2.20 | .08 |
| 2.13 | .05 |
| 2.08 | .10 |

The paper chromatographic behavior of the sulfate salts of antibiotics A–4993A and B is shown by the Rf values in Table I below. The values were obtained in the indicated solvent systems, using in each instance Whatman No. 1 paper. The location of the antibiotics on the chromatogram was determined by bioautograph using *Bacillus subtilis* as the organism.

TABLE I
Paper Chromatography of A–4993A and B Sulfates

| Solvent system | Rf value [4] | |
|---|---|---|
| | A–4993A | A–4993B |
| I [1] | 0.75 | 0.6 |
| II [2] | 0.45 | 0.31 |
| III [3] | 0.53 | 0.32 |

[1] Propanol, pyridine, acetic acid, water in the ratios of 15:10:3:12.
[2] n-Butanol saturated with 2 percent p-toluene sulfonic acid.
[3] n-Butanol saturated with 2 percent p-toluene sulfonic acid plus 2 percent piperidine.
[4] Rf value is defined as the ratio of the distance traveled by the antibiotic from the origin to the distance traveled by the solvent front from the origin.

By employing methods well known in the art, pharmaceutically acceptable salts of the A–4993 antibiotics can be prepared with mineral acids such a hydrochloric, hydrobromic, phosphoric and the like, and also with organic acids such as citric, tartaric, maleic, p-toluenesulfonic, salicylic, fumaric, maleic, acetic, propionic and the like. The antibiotic salts of such acids can be prepared, for example, by acidifying a solution of the antibiotic free base with the desired acid and freeze-drying the salt solution thus obtained. The salts can likewise be prepared in certain instances by ion exchange on an anionic type exchange column. Other commonly-used methods for the preparation of antibiotic salts can likewise be employed.

The novel antibiotics of this invention have an inhibitory action against the growth of microbial organisms, both bacteria and fungi, which are pathogenic to animal and plant life and are therefore useful in suppressing the growth of such organisms.

The minimal inhibitory concentrations of the sulfate salts of A–4993A and A–4993B, determined by the agar dilution test, for a number of illustrative organisms are listed in Table II.

TABLE II
Antibiotic Activity of A–4993A and A–4993B Sulfate Salts

| | Minimum inhibitory concentration (mcg./ml.) | |
|---|---|---|
| Test organism | A–4993A | A–4993B |
| *Staphylococcus aureus* | 100 | 100 |
| *Streptococcus faecalis* | 100 | 50 |
| *Proteus sp.* PR 15 | 25 | 25 |
| *Salmonella typhosa* | 12.5 | 12.5 |
| *Escherichia coli* | 50 | 50 |
| *Pasteurella multocida* | 12.5 | 12.5 |
| *Pseudomonas solanacearum* | 25 | 12.5 |
| *Erwinia amylovora* | 12.5 | 12.5 |
| *Xanthomonas phaseoli* | 12.5 | 12.5 |
| *Candida tropicalis* | 100 | 50 |
| *Botrytis cinerea* | 12.5 | 12.5 |
| *Ceratocystis ulmi* | 6.25 | 6.25 |
| *Verticillium albo-atrum* | 12.5 | 25 |

Antibiotics A–4993A and B are effective agents in the treatment of trypanosomiasis in mammals. The mixture of antibiotics isolated from the fermentation medium, as hereinafter described, is likewise effective in the treatment of trypanosomiasis. The effectiveness of the mixture of A–4993 antibiotics and the individual antibiotics, A–4993A and B, isolated therefrom against *Trypanosoma rhodesiense*, *Trypanosoma gambiense* and *Trypanosoma congolense* is demonstrated by the data presented in Table III. The data were acquired from tests carried out in the following manner:

Groups of four white mice weighing about 17 to 19 g. each were inoculated intraperitoneally with about one million trypansome organisms prepared in 0.85 percent saline and 2.0 percent sodium citrate solution. The antibiotic was administered by daily introperitoneal injection for four days post-infection, the first daily dose being administered six hours after inoculation of the trypanosomes. The effectiveness of the designated antibiotic was demonstrated by the average survival time, measured in days, for the treated mice compared to survival time of controls. Blood samples taken from treated mice surviving for thirty days were found to be free of trypanosomes. Control groups of mice were inoculated with trypanosomes in the same manner described above but were not treated with antibiotic. The average survival time was computed by dividing the sum of days survival for all mice in the group by the number of mice in the group. The individual antibiotics and the mixture thereof were employed in the sulfate salt form.

TABLE III.—TRYPANOCIDAL PROPERTIES OF A-4993 SULFATES

| | Trypanosome | | | | | | | | |
|---|---|---|---|---|---|---|---|---|---|
| | Trypanosoma rhodesiense | | | Trypanosoma gambiense | | | Trypanosoma congolense | | |
| Antibiotic | Dose, mg./kg., i.p. | Survival time (days) | Control survival (days) | Dose, mg./kg., i.p. | Survival time (days) | Control survival (days) | Dose, mg./kg., i.p. | Survival time (days) | Control survival (days) |
| A-4993A | 50 | 29-30 | 4 | 25 | ¹30 | 4 | 25 | 23-24 | 10-11 |
| A-4993B | 5 | ¹30 | 4 | 5 | 27-28 | 4 | 25 | ¹30 | 11 |
| A-4993 mixture | 25 | ¹30 | 4 | 50 | 27 | 3-4 | 50 | 26-27 | 8-9 |

¹ Negative parasitemia at 30 days.

The mixture of A-4993 antibiotics also has an inhibitory action on the growth of pleuropneumonia-like organisms (PPLO). For example, the minimum inhibitory concentration of the mixture of sulfate salts against *Mycoplasma gallisepticum* in the standard broth dilution test is 6.25 mcg./ml. When administered in a dose of about 25 mg./kg., subcutaneously in the neck of chicks infected with the organism, activity is demonstrated by the reduction in the number of air sac lesions.

When administered orally at a dose of about 250 mg./kg., the mixture of A-4993 sulfate salts is effective in the treatment of young rats infected with *Entamoeba histolytica*.

The mixture of A-4493 antibiotics also possesses anthelmintic activity as demonstrated by its activity against mouse pinworm infections. For example, when administered orally to mice at a single dose of 500 mg./kg. the mixture is effective in controlling both *Aspiculuris tetraptera* and *Syphacia obvelata* infections.

In addition to the foregoing activities, the A-4993 antibiotics also have insecticidal activity. For example, the kill rate of melon aphids on contact with an aqueous solution of the A-4993 mixture at a concentration of 100 p.p.m. is 81-90 percent.

The novel antibiotics of this invention are produced by culturing an A-4993 producing strain of an actinomycete organism under submerged aerobic conditions in a suitable culture medium until the culture medium contains substantial antibiotic activity. The antibiotics can be recovered by employing various isolation and purification procedures commonly used and understood in the art. The antibiotic-containing culture medium yields an antibiotic mixture comprising the antibiotics A-4993A and A-4993B. The individual antibiotics can be separated from each other and from other minor components of the fermentation mixture and obtained in crystalline form by chromatography and crystallization.

The actinomycete used according to this invention for the production of the antiobiotic mixture has been identified as a strain of *Streptomyces kentuckensis* Barr and Carman and has been deposited without restriction as to availability with the permanent culture collection of the Northern Utilization Research and Development Division, Agriculture Research Service, United States Department of Agriculture, Peoria, Ill. Its accession number in this collection is NRRL 3552. The strain was isolated from a soil sample collected in Mexico. The organism was isolated from the soil sample by suspending portions of the sample in sterile distilled water and streaking the suspensions on nutrient agar in petri plates. The seeded agar plates were incubated at 25-35° C. until growth was attained. After the incubation period, colonies of the A-4993-producing organisms were transferred with a sterile platinum loop to agar slants. The agar slants were then incubated to provide a suitable inoculum for the production of A-4993.

The organisms which produces the antibiotics of this invention is a biverticillate streptomycete and is assigned to the Biverticillus section, red series of the Pridham et al. system (Pridham, Hesseltine and Benedict, Applied Microbiol, 6, 52-79 (1958)). It can also be placed in the red group of Tresner and Backus, Applied Microbiol, 11, 335-338 (1963).

The principal morphological characteristics of the A-4993 producing strain of *Streptomyces kentuckensis* used in this invention are as follows: Cylindrical-shaped, smooth spores are borne on biverticillate sporophores. The spores are from light yellowish brown to grayish yellowish pink when viewed en masse. The vegetative mycelium ranges in color from a pale yellow to a grayish brown. The culture is melanin-negative. The culture displays moderate growth at incubation temperatures between about 26 and 37° C.

The methods employed in the taxonomic studies of the A-4993-producing strain of *Streptomyces kentuckensis*, NRRL 3552, are those recommended for the International Streptomyces Project for the characterization of Streptomyces spices. [Shirling and Gottlieb, Intern. Bull. Systematic Bacteriol., 16, 313-340 (1966).] Results of the taxonomic studies are summarized in the paragraphs which follow. Color names were assigned according to the Inter-Society Color Council-National Bureau of Standards (ISCC-NBS) method. Kelly and Judd, The ISCC-NBS Method of Designating Colors and a Dictionary of Color Names, U.S. Dept. of Commerce, Circ. 553, Washington, D.C., 1955. The letters in parentheses refer to color blocks and the underlined letters and numbers to color tabs in Tresner and Backus, Appl. Microbiol, 11, 335-338 (1963). The numbers in brackets refer to color blocks in Maerz and Paul, Dictionary of Color, McGraw-Hill Book Co., Inc., New York (1950). ISP numbers refer to the International Streptomyces Project media which are available from Difco Laboratories, Detroit, Mich. Observations were made following incubation at 30° C. for fourteen days unless noted otherwise.

Microscopic morphology, cultural characteristics and Physiology of *Streptomyces kentuckensis* NRRL 3552

Microscopic morphology.—Biverticillate, straight sporophores are produced sparsely and only on ICP No. 4 and glucose-asparagine agars. Spores are cylindrical, measuring 0.7 to 1.0μ in width and 1.04 and 2.6μ in length Spores are smooth as observed by electron microscope.

Cultural characteristics on:

ISP medium No. 20.—Moderate growth with neither aerial mycelium nor spores. Reverse grayish brown. No soluble pigment.

ISP medium No. 3.—Moderate growth with absence of aerial mycelium and spores. Reverse light olive [14L6]. A brown soluble pigment is produced.

ISP medium No. 2.—Moderate growth with neither 5 ec [3B8]. Reverse brownish gray [16A8]. A brown soluble pigment is produced.

ISP medium No. 5.—Moderate growth, lacking aerial mycelium and spores. Reverse brownish gray [15A5]. No soluble pigment.

Tomato paste-oatmeal agar.—Abundant growth with scant aerial mycelium and spores. White (w) a; reverse dark grayish reddish brown [16A8]. No soluble pigment.

Calcium malate agar.—Abundant growth with neither aerial mycelium nor sporulation. Reverse brownish gray [16A7]. No soluble pigment.

Emerson's agar.—Abundant growth with neither aerial mycelium and spores. Reverse brownish gray [15A5]. No soluble pigment.

Bennett's agar.—Abundant growth, lacking aerial mycelium and spores. Reverse light grayish olive [14B3]. No soluble pigment.

Czapek's agar.—Fair hyaline growth with no aerial mycelium. No soluble pigment.

Glucose-asparagine agar.—Moderate growth, reverse brownish gray [15A5]. Moderate aerial mycelium and sporulation. Light grayish yellowish brown (GY) 3 ge [13B6]. No soluble pigment.

Tyrosine agar.—Fair growth with neither aerial mycelium nor spores. Reverse dark gray [15A2]. No soluble pigment.

Nutrient agar.—Moderate growth with absence of aerial mycelium and spores. Reverse pale yellow [11C1]. No soluble pigment.

Nitrate reduction.—Negative.

Gelatin liquefaction.—Negative.

Melanin production:
 (a) Peptone-iron agar.—Negative.
 (b) Tryptone-yeast extract broth.—Negative. Temperature requirements.—Moderate growth and sporulation on ICP No. 2 from about 26 to 37° C. No growth at 43° C.

Response of substrate color to pH change.—Unaffected.

Table IV summarizes the results of the carbon utilization tests carried out on the A-4993 producing strain of *S. kentuckensis*, NRRL 3552. The symbols employed in the table are interpreted as follows:

+=positive utilization
(+)=probable utilization
(−)=questionable utilization
−=no utilization

TABLE IV

Carbon Utilization of *S. Kentuckensis*, Strain NRRL 3552

| Substrate: | Response |
|---|---|
| L-arabinose | (+) |
| cellobiose | + |
| i-inositol | (−) |
| D-xylose | (−) |
| rhamnose | − |
| raffinose | + |
| D-mannitol | − |
| sucrose | (−) |
| dextrose | + |

A comparison was made of the above cultural characteristics for *Streptomyces kentuckensis* Barr and Carmen strain NRRL 3552 with type cultures of similar streptomyces species. These species described in International J. of Systematic Bacteriol., 18: 69–189 and 279–392, 1968, and the observed cultural differences are as follows:

*S. kentuckensis* (*Streptoverticillium kentuckense*) differs from the A-4993 producing strain by producing a melanin pigment in peptone-yeast-iron agar and in tryptone-yeast broth. A soluble pigment is not produced.

*S. grieseocarneus* (*Streptoverticillium griseocarneium*) produces a melanin pigment; produces shorter chains of spores and does not form a soluble pigment.

*S. lilacinus* produces shorter spore chains with short cylindrical spores; a melanin pigment is produced as well as a red soluble pigment. Vegetative mycelia produced are brown to red in color.

*S. hachijoensis* produces shorter spore chains and a trace of yellow soluble pigment.

As previously noted, strain NRRL 3552 can be grown in a culture medium to produce antibiotics A-4993A and A-4993B. The culture medium can be any one of a number of different media. However, for economy of production, maximum yield, and ease of antibiotic isolation, certain media are preferred. Thus, for example, molasses is one of the preferred sources of carbohydrate, although glucose, dextrin, and glycerol can also be used. Preferred nitrogen sources are soybean meal, amino acid mixtures, peptones and the like.

Nutrient inorganic salts to be incorporated in the culture media can include the usual salts capable of yielding sodium, potassium, ammonium, calcium, phosphate, sulfate, chloride, bromide, nitrate, carbonate and like ions. The addition of magnesium and iron salts, preferably the sulfates, has an especially beneficial effect on the production of the A-4993 antibiotic mixture. As is necessary for the growth and development of other microorganisms, essential trace elements should likewise be added to the culture medium for culturing the organism of this invention. Such trace elements are commonly added as impurities incidental to the addition of the other ingredients of the culture medium.

The organism used to produce A-4993A and B is capable of growth over a wide pH range. For example, the initial pH of the various media which can be employed to culture the organism can range from pH 6.0 to pH 7.5. As is the case with other actinomycetes, the medium gradually becomes more alkaline and may attain a pH of from about pH 6.5 to about pH 8.5 during the growth period. However, the harvest pH at the end of the fermentation period is usually about pH 7.0 to pH 7.5.

Preferably, submerged aerobic fermentation in large tanks is used for the production of substantial quantities of the A-4993 antibiotic mixture. Small quantities of the antibiotics are obtained by shake flask cultures. Because of the time lag in antibiotic production commonly associated with the inoculation of large tanks with the spore form of the organism, it is preferable to use a vegetative inoculum. The vegetative inoculum is prepared by inoculating a small volume of the culture medium with the spore form of the organism to obtain a fresh, actively growing culture of the organism. The vegetative inoculum is then transferred to the larger tank. The medium used for the growth of the vegetative inoculum can be the same as that employed for larger fermentations, although other media can be employed.

The A-4993 producing organism can be grown at temperatures between about 26 and 37° C. Production of optimal yields of the antibiotics appears to occur at a temperature between about 26–30° C.

The production of antibiotic activity during the fermentation can be followed by testing samples of the fermentation broth for their antibiotic activity against organisms known to be sensitive to the antibiotic. One such assay organism useful in the present invention is *Bacillus subtilis*. The bio-assay can be carried out by the paper disc assay on agar plates.

As with most submerged aerobic antibiotic fermentations, sterile air is passed through the culture medium to obtain more efficient growth of the organism and increased antibiotic production. The volume of air forced through the culture medium is usually at least about 0.1 volume of air per minute per volume of culture medium. More aeration can be employed, however, to obtain even more efficient growth and enhanced antibiotic production.

Generally, maximum production of the antibiotic occurs within about two to six days in large tank or shake flask fermentations. Commonly, maximum production of antibiotic activity is realized within about 48 to 72 hours.

The A-4993 antibiotics can be recovered from the culture medium and separated from other substances which may be present by extractive and adsorptive techniques. Adsorption techniques are preferred because such procedures avoid the use of large volumes of solvents required in extraction procedures. The A-4993 antibiotics, A and B, are first recovered as a mixture. The mixture, after further purification, is separated into the individual antibiotic substances. Thus, for example, the fermentation broth is adjusted to pH 4.5 by the addition of 5 N sulfuric acid and filtered. The filtrate is passed over a cationic exchange resin consisting of a methacrylic carboxylic acid polymer, such as that sold commercially as Amberlite IRC-50. (Rohm and Haas, Washington Square, Philadelphia, Pa.) The column is washed with water and the adsorbed antibiotics are eluted with 0.1 N sulfuric acid. The active fractions are combined and neutralized with a concentrated solution of barium hydroxide. The precipitated barium sulfate is filtered, the filtrate is concentrated in vacuo and the antibiotic containing concentrate is lyophilized. The lyophilized powder comprising antibiotics A-4993A and B as sulfate salts can be further purified and decolorized by gel filtration. A modified dextran, such as that commercially available under the trade name of Sephadex G-25 (distributed by Pharmacia Fine Chemicals, Inc., New York, N.Y.), is suitable for the gel. The active fractions are combined and lyophilized.

The antibiotics A-4993A and B comprising the dried mixture can be separated and isolated as individual substances if desired. The mixture of antibiotic sulfates as obtained after decolorization and preliminary purification over Sephadex G-25 is chromatographed over a column packed with magnesium silicate, and thereby separated into the individual antibiotics A-4993A and A-4993B in substantially pure form. Alternatively, the mixture can be chromatographed over a column packed with cellulose to obtain the separated individual antibiotics in substantially pure form. The separated antibiotics as obtained from either chromatographic procedure are further purified and obtained as crystalline sulfates, if desired, by chromatography over sulfuric acid treated alumina followed by crystallization from water-ethanol.

The alternative chromatographic procedures for the separation of the antibiotic mixture into its individual components is described more fully hereinbelow.

(A) Separation of A-4993 antibiotics over magnesium silicate

The lyophilized antibiotic mixture obtained after gel filtration is dissolved in water and added to the top of a column packed with a synthetic magnesium silicate such as that sold under the trade name of Florisil (The Floridin Company, P.O. Box 989, Tallahasee, Fla.). The column is washed with 0.5 percent acetic acid and the antibiotics are then eluted with one percent acetic acid. The progress of the elution is followed by bioassay and by paper chromatography. Antibiotic A-4993B comes off the column first and is followed in subsequent fractions by antibiotic A-4993A. The column fractions containing A-4993A are pooled and likewise, the fractions containing A-4993B are combined. The respective antibiotic containing pooled fractions are then each chromatographed over a column packed with alumina treated with sulfuric acid in the following manner. Chromatographic alumina F 20 (Alumina Company of America, 230 Park Avenue, New York, N.Y.) is slurried in water adjusted to pH 3 with sulfuric acid. The slurry is maintained at pH 3 overnight, filtered, and the alumina is washed with water and dried. The dried alumina is then packed into the column with methanol and the pooled antibiotic-containing eluate off the magnesium silicate chromatogram is placed on the column. The column is washed with methanol and the antibiotic is eluted with 50 percent aqueous methanol. The active fractions of eluate are combined and concentrated to a small volume. Addition of ethanol to the concentrate causes precipitation of the crystalline sulfates of the individual antibiotics. Antibiotic A-4993B is more readily precipitated in crystalline form from its concentrate than is A-4993A because of its somewhat lower water solubility. Antibiotic A-4993A requires chilling to induce crystallization. Alternatively, the combined eluate fractions can be evaporated to dryness or freeze-dried to dry amorphous powders and then crystallized from ethanol water.

(B) Separation of A-4993 antibiotics over cellulose

The crude lyophilized antibiotic sulfate mixture as obtained after preliminary purification over Sephadex G-25 is dissolved in a mixture of water, acetic acid, pyridine and propanol, in the ratio of 15:10:3:12 and added to a column packed with cellulose (Avicel, commercially available from the Food Machinery and Chemical Corp., 161 East 42d Street, New York, N.Y.). The adsorbent is packed into the column with a solvent mixture of propanol:pyridine:acetic acid:water (15:10:3:12) and the same solvent system is employed to develop the column. The elution is followed by paper chromatography and fractions containing the same individual antibiotic are combined and concentrated to a small volume. Addition of ethanol to the concentrate provides a precipitate of the separated antibiotic. Each separated antibiotic thus obtained can be further purified and obtained as its crystalline sulfate by chromatography over sulfuric acid treated alumina as previously described.

The preferred methods of isolation and purification of the individual A-4993 antibiotics of this invention is the last described separation method comprising cellulose and alumina chromatography.

Although antibiotics A-4993A and A-4993B have been separately isolated and characterized and are useful, as such, for many purposes; the antibiotic mixture can itself be used after preliminary purification. The crude mixture of antibiotic sulfates can be purified by chromatography over sulfuric acid treated alumina in the same manner that the individual A-4993 antibiotics are purified. Accordingly, the crude antibiotic mixture of sulfates, as obtained from a carboxylic acid cation exchange resin or after subsequent preliminary purification over Sephadex G-25, is added to a column packed with acid treated alumina and eluted with 50 percent aqueous methanol. The active fractions are combined and concentrated to a small volume. On addition of ethanol to the concentrate, a precipitate of a mixture of the crystalline sulfates of A-4993A and A-4993B is obtained.

As previously indicated, the A-4993 antibiotic mixture is active against PPLO organisms and various species of trypanosomes and also has inhibitory action against the growth of a variety of plant and animal pathogens. Accordingly, the purified mixture can be used in any suitable dispensing composition commonly employed for the treatment of infected animals. For example, the mixture can be injected as a solution into chickens infected with PPLO organisms or added to their feed or water supply to combat the infection. Similarly, the separated individual antibiotics A-4993A and A-4993B can be employed for the same purpose.

This invention is further illustrated by the following example but is not thereby limited.

EXAMPLE I (A) Shake flask fermentation of A-4993 antibiotics

Spores of *Streptomyces kentuckensis* strain NRRL 3552 were inoculated on a nurient agar slant having the following composition:

Ingredient: G.
    Oatmeal _____ 65
    Agar _____ 20
    Water, added to a volume of 1 liter.

The slant was incubated for about 4 to 5 days at about 30° C. The mature slant culture was covered with sterile distilled water and scraped gently with a sterile rod to obtain a spore suspension.

One ml. of the spore suspension thus obtained was used to inoculate 100 ml. of a sterile vegetative growth medium having the following composition:

| Ingredient: | Percent (weight/volume) |
| --- | --- |
| Glucose | 15 |
| Soybean meal | 15 |
| Cornsteep solids | 5 |
| Calcium carbonate | 2 |
| Sodium chloride | 5 |
| Tap water added to one liter. | |

The inoculated vegetative medium was grown for forty-eight hours at 30° C. with constant agitation on a reciprocal shaker having a 2-inch stroke at 108 r.p.m. This vegetative inoculum was then employed to inoculate a sterile production medium having the following composition:

| Ingredient: | Percent (weight/volume) |
| --- | --- |
| Soybean meal | 15 |
| Casin | 1 |
| Sodium nitrate | 3 |
| Glucose syrup | 20 |
| Calcium carbonate | 2.5 |
| Water added to a volume of one liter. | |

One hundred ml. portions of the production medium were placed in a 500 ml. Erlemeyer flask, and sterilized at 120° C. for 30 minutes. On cooling, the medium was inoculated with a five percent vegetative inoculum as previously defined. The culture fermentation is shaken for about 48 to 72 hours at a temperature between about 26 to 30° C. on either a rotary shaked operating at 250 r.p.m. or a reciprocal shaker operating at 108 strokes per minute. The initial pH range is about pH 6.0 to pH 7.5. Harvest pH is about pH 7.0 to pH 7.5.

(B) Forty-liter tank fermentation of A–4993 antibiotics

Spores of the A–4993 producing organism were inoculated on a nutrient agar slant having the following composition:

| Ingredient: | G. |
| --- | --- |
| Soluble starch | 10 |
| NaCl | 1 |
| $(NH_4)_2SO_4$ | 2 |
| Trace salt solution [1] ml | 1 |
| $K_2HPO_4$ | 1 |
| $MgSO_4 \cdot 7H_2O$ | 1 |
| $CaCO_3$ | 2 |
| Washed agar | 30 |
| Deionized water added to one liter. | |

[1] Trace salt solution.

| Ingredient: | G. |
| --- | --- |
| $Fe(SO_4)_2 \cdot 7H_2O$ | 0.1 |
| $MnCl_2 \cdot 4H_2O$ | 0.1 |
| $ZnSO_4 \cdot 7H_2O$ | 0.1 |
| Deionized water added to 100 ml. | |

The slant was incubated for about 4 to 5 days at about 30° C. The mature slant was covered with sterile distilled water and gently scraped to obtain a spore suspension. Ten ml. of the spore suspension thus obtained was used to inoculate one liter of a sterile vegetative growth medium having the following composition, where the percentages of solid ingredients are expressed on a weight-per-volume basis and the fluid components are expressed on a volume-per-volume basis.

| Ingredient: | Percent |
| --- | --- |
| Glucose | 0.5 |
| Dextrin 700 [1] | 2.5 |
| Corn steep liquor | 0.25 |
| NZ Case [2] | 0.5 |
| Black strap molasses | 0.5 |
| Water added to one liter. | |

[1] Potato starch (Morningstar Paisley Co.).
[2] Hydrolyzed casein (Sheffield Products Co.).

The inoculated vegetative medium was grown for 48 hours at about 30° C. with constant agitation on a rotary shaker. This vegetative inoculum was then employed to inoculate a sterile production medium having the following composition, where the percentages of solid ingredients are expressed on a weight-per-volume basis and the fluid ingredients on a volume-per-volume basis.

| Ingredient: | Percent |
| --- | --- |
| Dextrin 700 | 6.0 |
| Casamino acids [1] | 0.6 |
| Nutrisoy flour [2] | 1.5 |
| Blackstrap molasses | 1.0 |
| Magnesium sulfate $\cdot 7H_2O$ | 0.82 |
| Water added to make 25 liters. | |

[1] Acid hydrolyzed casein (Difco Co.).
[2] Soybean flour (Archer, Daniels, Midland Co.).

The production medium thus made up was adjusted to pH 7.0 with sodium hydroxide and autoclaved prior to inoculation with the vegetative inoculum. The inoculated culture medium contained in a 40-liter fermentation tank was allowed to ferment at a temperature of about 30° C. and throughout the fermentation was stirred and aerated with sterile air in an amount of about one-half volume of air per volume of culture medium per minute. The fermentation was allowed to proceed for about 4 days, during which time the culture medium gradually increased in pH from an initial level of about pH 6.5 to about pH 7.0 to 7.5.

(C) Isolation of antibiotic mixture

The whole fermentation broth obtained from an A–4993 fermentation, as described above, was adjusted to pH 4.5 by the addition of 5 N sulfuric acid and filtered with the aid of a commercial filter aid. The filtered broth was passed at a flow rate of about 30–40 ml. per minute over a 4.7 cm. x 60 cm. column containing the cationic exchange resin "IRC–50" in the hydrogen cycle. After all the broth was passed through the column, the resin was washed with a volume of deionized water equal to about one-half the original broth volume until the eluate was colorless. The water-wash effluent was discarded.

The adsorbed antibiotics on the column were eluted with 0.1 N sulfuric acid. The elution fractions containing antibiotic activity, as determined by bio-assay with *Bacillus subtilis* and paper chromatography, were combined. The combined active fractions were neutralized to a pH of about pH 7 by the addition of a saturated aqueous solution of barium hydroxide. By this neutralization procedure, the excess sulfuric acid was removed as barium sulfate while the basic antibiotics remained in solution as the sulfate salts. The barium sulfate precipitate was filtered and the filtrate was concentrated in vacuo to a volume of about 200 ml. The concentrate was lyophilized to a dry amorphous powder comprising a mixture of antibiotics A–4993A and A–4993B in the crude sulfate salt form. (Alternatively, the antibiotic mixture can be precipitated by the addition of ethanol to the aqueous antibiotic concentrate.)

The antibiotic mixture was further purified and decolorized in the following manner: The amorphous antibiotic powder was dissolved in 250 ml. of water and passed over a 7 cm. x 60 cm. column containing a modified dextran sold commercially under the trade name of Sephadex G-25. The active fractions were combined and lyophilized to yield a white amorphous powder comprising antibiotics A-4993A and A-4993B as the sulfate salts in substantially pure form.

(D) Purification of A-4993 antibiotic mixture

Ten grams of the A-4993 sulfate mixture, obtained from either the Sephadex G-25 preliminary purification or from the IRC-50 resin without Sephadex purification, was dissolved in 100 ml. of water and applied to a 3 cm. x 85 cm. column containing acid washed chromatographic alumina, F 20, supplied by the Alumina Company of America. (Prior to packing in the column with methanol, the alumina was slurried in water adjusted to pH 3 with sulfuric acid and maintained at that pH overnight. The acid slurry was filtered and the alumina was washed with water and dried.) After the aqueous antibiotic solution was applied, the column was washed with two liters of methanol. The antibiotic activity was then eluted with 50 percent aqueous methanol. The active fractions were combined and evaporated to a volume of about 50 ml. The concentrate was cooled to about 5° C. and 150 ml. of ethanol were added to precipitate a crystalline mixture of antibiotics A-4993A and A-4993B sulfate salts.

(E) Separation and purification of antibiotics A-4993A and B by magnesium silicate chromatorgraphy Five grams of amorphous antibiotic mixture was dissolved in 100 ml. of distilled water and passed over a 4 cm. x 20 cm. column containing a magnesium silicate adsorbent sold commercially under the trade name Florisil. The adsorbent was previously washed with deionized water. After all of the antibiotic solution was passed over the column, the column was washed with 2500 ml. of 0.5 percent acetic acid and the washings were discarded. The column was then eluted with one percent aqueous acetic acid. The effluent was collected in multiple fractions, antibiotic A-4993B coming off the column in the early fractions while antibiotic A-4993A was collected in subsequent fractions. The identity of the antibiotic in the respective column fractions was determined by paper chromatography. The column fractions containing each antibiotic were combined and evaporated in vacuo to yield the respective individual antibiotics as amorphous powders in substantially pure form. The individual antibiotics A-4993A and A-4993B were then separately purified and obtained as crystalline sulfate salts by chromatography over acid washed alumina in the following manner. Ten grams of the A-4993A dried amorphous powder was dissolved in 100 ml. of water and applied to a 3 cm. x 85 cm. column containing sulfuric acid washed F 20 chromatographic alumina prepared and packed as previously described. After the antibiotic solution had been applied, the column was washed with about two liters of methanol. The A-4993A was eluted with 50 percent aqueous methanol. All active fractions were combined and evaporated to a volume of about 30 ml. The antibiotic A-4993A sulfate was obtained as a crystalline precipitate by the addition of about 150 ml. of ethanol to the concentrate.

In a similar manner, antibiotic A-4993B sulfate was obtained in crystalline form.

(F) Separation and purification of antibiotics A-4993A and B by cellulose chromatography Twenty grams of crude A-4993 sulfate mixture was first dissolved in 80 ml. of water and 20 ml. of acetic acid, and 66 ml. of pyridine and 100 ml. of propanol were added to the solution. The solution was added to a 7 cm. by 60 cm. column containing cellulose. (Avicel). The cellulose was packed in the column with a solvent system comprising propanol:pyridine:acetic acid:water in the ratio of 15:10:3:12. The antibiotics were eluted from the column with the same solvent system. All fractions containing antibiotic A-4993A, as determined by paper chromatography, were combined. Likewise all fractions containing antibiotic A-4993B were combined. The separate pooled fractions were evaporated to a volume of about 60 ml. each and were diluted with 20 volumes of ethanol to effect precipitation of the respective individual antibiotics in non-crystalline form.

The individual antibiotics, A-4993A and A-4993B obtained by the above described cellulose chromatography can each be separately purified and obtained as crystalline sulfates by chromatography over sulfuric acid washed alumina as described. The A-4993A and B sulfates can be further purified if necessary by recrystallization from ethanol-water.

Under the described fermentation conditions, antibiotic A-4993A is usally produced in greater abundance than antibiotic A-4993B. As is well understood in the art, however, variations of fermentation conditions and the use of mutant strains of the antibiotic-producing organism frequently affect the relative proportions of antibiotics produced in fermentations in which more than one active component is produced. Changes in fermentation conditions can include variation of culture medium nutrients and inorganic salt constitutents. Mutant strains of the producing organism can be produced by a variety of techniques known in the art, such as chemical mutation and mutations induced by actinic radiation.

We claim:

1. The antibiotic substance A-4993A or a pharmaceutically acceptable acid addition salt thereof, which antibiotic in the form of its sulfate salt is a white, crystalline substance soluble in water and insoluble in the common organic solvents; decomposes above 230° C.; has titratable groups having pK'a values of 5.4, 9.8, and 12.2 as determined by electrometric titration in 66 percent aqueous dimethylformamide; has an approximate molecular weight as calculated from titration data of 623; has the approximate composition of 37.60 percent carbon, 5.44 percent hydrogen, 19.62 percent nitrogen, 28.24 percent oxygen and 7.03 percent sulfur; and has the following distinguishable bands in its infrared absorption spectrum when determined in a mineral oil mull: 3.2 (broad), 5.97, 6.26, 6.33, 6.39, 6.47, 6.78, 6.84, 6.94, 7.12, 7.28, 7.76, 8.08, 9.2 (broad), 9.45 (broad), and 10.30 microns.

2. The sulfate salt of antibiotic A-4993A as defined in claim 1.

3. A method of producing the antibiotic of claim 1 which comprises cultivating the organism *Streptomyces kentuckensis* NRRL 3552 in a liquid culture medium containing assimilable sources of carbon, nitrogen, and inorganic salts, under submerged aerobic conditions until a substantial amount of antibiotic activity is imparted by said organism to said culture medium, recovering said antibiotic from said culture medium and isolating said antibiotic free of the antibiotic A4993B by chromatography over a non-ionic adsorbent.

4. The antibiotic substance A-4993B or a pharmaceutically acceptable acid addition salt thereof, which antibiotic in the form of its sulfate salt is a white, crystalline substance melting with decomposition at about 257 to 258° C.; is soluble in water and insoluble in the common organic solvents; has titratable groups having pK'a values of 5.0, 10.1 and 11.6 as determined by electrometric titration in 66 percent aqueous dimethylformamide; has an approximate molecular weight of 432 as calculated from titration data; has the approximate composition of 37.26 percent carbon, 5.23 percent hydrogen, 22.16 percent nitrogen, 27.6 percent oxygen and 7.4 percent sulfur; and has the folowing distinguishable bands in its infrared absorption spectrum when determined in a mineral oil mull: 3.15 (broad), 3.44, 3.51, 5.97, 6.29, 6.50, 6.77, 7.12, 7.28, 7.47, 7.77, 8.10, 9.7 (broad), 10.28, and 10.56 microns.

5. The sulfate salt of antibiotic A-4993B as defined in claim 4.

6. A methor of producing the antibiotic of claim 4 which comprises cultivating the organism *Streptomyces*

*kentuckensis* NRRL 3552 in a liquid culture medium containing assimilable sources of carbon, nitrogen, and inorganic salts, under submerged aerobic conditions until a substantial amount of antibiotic activity is imparted by said organism to said culture medium, recovering said antibiotic from said culture medium and isolating said antibiotic free of the antibiotic A–4993A by chromatography over a non-ionic adsorbent.

References Cited

Miller, The Pfizer Handbook of Microbial Metabolites, McGraw-Hill Book Co., Inc., N.Y., 1961, p. 604.

JEROME D. GOLDBERG, Primary Examiner

U.S. Cl. X.R.

195—80